July 12, 1932.  H. A. GEHRES  1,866,702
DRIVING CONNECTION
Filed April 15, 1930
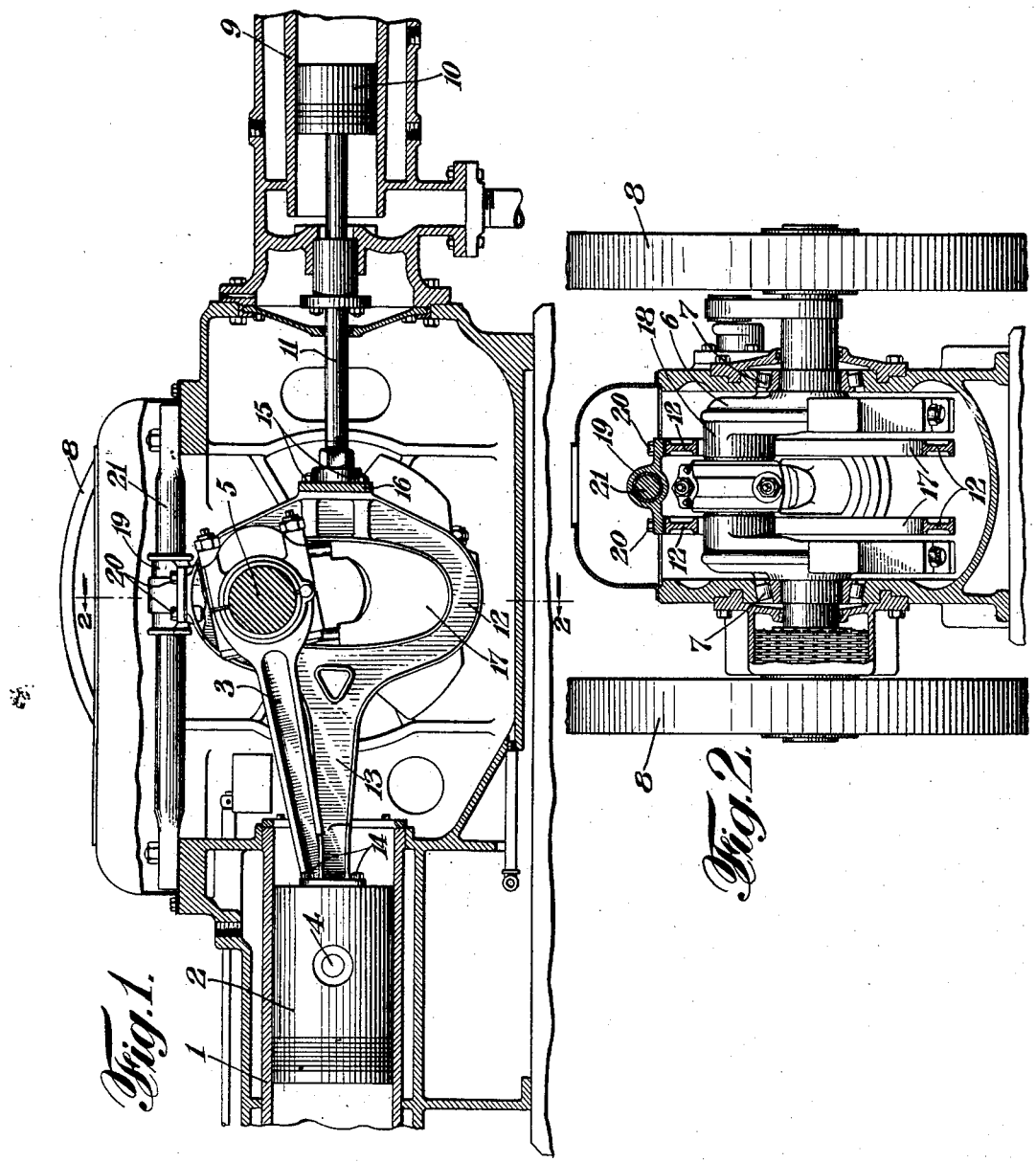
INVENTOR
Hewitt A. Gehres
BY
Ward Crosby & Neal
ATTORNEYS Patented July 12, 1932

1,866,702

UNITED STATES PATENT OFFICE

HEWITT A. GEHRES, OF MOUNT VERNON, OHIO, ASSIGNOR TO COOPER-BESSEMER CORPORATION, OF MOUNT VERNON, OHIO, A CORPORATION OF OHIO

DRIVING CONNECTION

Application filed April 15, 1930. Serial No. 444,519.

The invention relates to a driving connection designed more particularly for air compressors driven from gas engines, and aims primarily to provide such a connection which will enable the installation to be made more compact and economical, while still being adequate from the standpoint of strength, stress distribution, etc.

Further objects and advantages of the invention will be in part obvious and in part specifically pointed out in the description hereinafter contained which, taken in conjunction with the accompanying drawing, discloses a preferred embodiment of the invention. Such embodiment, however, is to be considered merely as illustrative of its principles. In the drawing—

Fig. 1 is a vertical longitudinal sectional view taken through a gas engine and air compressor installation, provided with a driving connection embodying the features of the present invention.

Fig. 2 is a transverse section taken on line 2—2 of Fig. 1, looking in the direction of the arrows.

The invention as illustrated is applied to a gas engine having a cylinder 1, piston 2, preferably of the trunk type, and a connecting rod 3, connected between the pin 4 of the piston and a crank pin 5 on crank 6 which is illustrated as being of the center type and provided with suitable bearings 7 on each side, and fly-wheels 8.

The compressor to be driven by the gas engine is shown as provided with a cylinder 9 alined with cylinder 1 above mentioned, a piston 10 and a piston rod or plunger 11 extending toward the crank structure above described. Since the specific construction of many of the parts of the gas engine and compressor units are not important to the present invention, they will not be described in detail herein.

It has heretofore been proposed to drive compressors from engines by the use of yokes interposed therebetween, but the yokes heretofore suggested for such purpose in so far as I am aware, have been so constructed as to lie in the plane of movement of the connecting rod, and therefore had to be of such large size, to allow the connecting rod to swing angularly within them, that the yokes could not penetrate into the engine cylinder to any substantial extent, and therefore the installation necessarily became unduly long.

In accordance with the present invention I employ a yoke, or preferably two yokes, for the above purpose, which are located at one side, or on opposite sides, of the plane of movement of the connecting rod, whereby the engine end of the yoke may be so reduced in size as to be capable of penetrating into the engine cylinder along with the connecting rod; thus the length of the engine may be substantially shortened, since the yoke need no longer be kept outside of the engine cylinder, and a trunk type piston may be employed without setting up undue stresses.

In the illustrated form of the invention a yoke 12 is located on one side of the connecting rod 3 and provided with an arm 13 extending into the engine cylinder 1 and suitably connected to the piston 2 as by bolts 14. The opposite end of yoke 12 is shown as secured by bolts 15 to a transverse plate 16 on the end of piston rod 11. The yoke is provided with a large opening 17 within which an extension 18 on the crank pin rotates (with clearance) as the engine reciprocates, the yoke being thus interposed between the path of travel of the connecting rod 3, and the path of travel of crank 6.

As shown in Fig. 2, I prefer to employ a pair of yokes 12, one on each side of the connecting rod 3, and each constructed as above set forth. This will balance the stresses set up, and in the illustrated form of the invention the weight of the two yokes 12 is carried by guide sleeve 19 secured to the tops of the yokes by bolts 20 and slidable along a stationary rod 21.

As shown by Fig. 1, the angularity of the connecting rod 3 is the limiting factor on the length of the engine, the driving yokes not requiring any extra length to clear them of the cylinder walls, and the trunk type piston with its pin 4 located well within it, provides adequate bearing for the parts during operation without the necessity of employing a crosshead.

While a specific form of the invention has been described it should be understood that many changes may be made therein without departing from its principles as set forth in the appended claims.

I claim:

1. In combination, a driving cylinder, a piston of the trunk type working therein, a crank and crank pin, a connecting rod direct connected and pivoted with respect to the piston and crank pin, a driven plunger and means for driving said plunger from said piston comprising a yoke interposed therebetween, said yoke being located between the paths of swing of the connecting rod and crank.

2. In combination, a driving cylinder, a piston of the trunk type working therein, a pair of cranks and a crank pin therebetween, a connecting rod direct connected and pivoted with respect to the piston and crank pin, a driven plunger, and means for driving said plunger from said piston comprising a pair of yokes interposed therebetween, said yokes being located on opposite sides of the connecting rod and being respectively interposed between the paths of swing of the connecting rod and corresponding crank.

3. In combination, a driving cylinder, a piston of the trunk type working therein, a crank and crank pin, a connecting rod direct connected and pivoted with respect to the piston and crank pin, a driven plunger, and means for driving said plunger from said piston comprising a pair of yokes interposed therebetween, said yokes being located on opposite sides of the connecting rod and being respectively interposed between the paths of swing of the connecting rod and corresponding crank, said yokes being provided with intermediate portions shaped to clear the path of swing of the crank pin.

4. In combination, a driving cylinder, a piston of the trunk type working therein, a crank and crank pin, a connecting rod direct connected and pivoted with respect to the piston and crank pin, a driven plunger and means for driving said plunger from said piston comprising a yoke interposed therebetween, said yoke being located between the paths of swing of the connecting rod and crank and a slidable support for said yoke.

In testimony whereof I have signed my name to this specification.

HEWITT A. GEHRES.